United States Patent
Aitoh et al.

(10) Patent No.: US 10,915,679 B2
(45) Date of Patent: Feb. 9, 2021

(54) BREAK PREDICTION METHOD, BREAK PREDICTION DEVICE, PROGRAM, RECORDING MEDIUM, AND BREAK DISCERNMENT STANDARD CALCULATION METHOD

(71) Applicant: NIPPON STEEL & SUMITOMO METAL CORPORATION, Tokyo (JP)

(72) Inventors: Takahiro Aitoh, Kimitsu (JP); Yoshiyuki Kaseda, Toyonaka (JP); Yusuke Tsunemi, Chiba (JP)

(73) Assignee: NIPPON STEEL CORPORATION, Tokyo (JP)

( * ) Notice: Subject to any disclaimer, the term of this patent is extended or adjusted under 35 U.S.C. 154(b) by 563 days.

(21) Appl. No.: 15/552,666

(22) PCT Filed: Feb. 17, 2016

(86) PCT No.: PCT/JP2016/054552
§ 371 (c)(1),
(2) Date: Aug. 22, 2017

(87) PCT Pub. No.: WO2016/136553
PCT Pub. Date: Sep. 1, 2016

(65) Prior Publication Data
US 2018/0032654 A1 Feb. 1, 2018

(30) Foreign Application Priority Data
Feb. 26, 2015 (JP) .................. 2015-037121

(51) Int. Cl.
*G06F 30/23* (2020.01)
*G01N 3/00* (2006.01)
(Continued)

(52) U.S. Cl.
CPC .............. *G06F 30/23* (2020.01); *G01N 3/00* (2013.01); *G01N 3/08* (2013.01); *G06F 2111/10* (2020.01)

(58) Field of Classification Search
CPC ... G06F 17/5018; G06F 2217/16; G01N 3/00; G01N 3/08
See application file for complete search history.

(56) References Cited

U.S. PATENT DOCUMENTS

2007/0199924 A1* 8/2007 Yoshida .................. B23K 11/11
219/109
2010/0131256 A1* 5/2010 Hallquist ............... B23K 11/34
703/8
(Continued)

FOREIGN PATENT DOCUMENTS

CN     1942750 A      4/2007
CN    101739490 A      6/2010
(Continued)

OTHER PUBLICATIONS

Extended European Search Report for European Application No. 16755300.7, dated Oct. 8, 2018.
(Continued)

*Primary Examiner* — Rehana Perveen
*Assistant Examiner* — Chuen-Meei Gan
(74) *Attorney, Agent, or Firm* — Birch, Stewart, Kolasch & Birch, LLP

(57) ABSTRACT

A break prediction method according to the present invention predicts a break of a joint portion of an object to be analyzed including a pair of members joined to each other by using a finite element method, and includes a first step of acquiring at least an element size of a base material portion, from among parameters set in an element model for the object to be analyzed; a second step of calculating, as a break discernment standard, a break limit moment defined by a (Continued)

function including the element size of the base material portion as a variable; and a third step of discerning whether the moment applied to the joint portion in a deformation analysis of the element model for the object to be analyzed exceeds the break limit moment, and outputting the result of the discernment as a break prediction result for the joint portion.

28 Claims, 3 Drawing Sheets

(51) Int. Cl.
  *G06F 111/10* (2020.01)
  *G01N 3/08* (2006.01)

(56) References Cited

U.S. PATENT DOCUMENTS

| | | | | |
|---|---|---|---|---|
| 2013/0000415 | A1* | 1/2013 | Yoshida | B23K 11/11 73/827 |
| 2015/0330881 | A1* | 11/2015 | Niwa | G06F 17/5018 73/788 |
| 2018/0032654 | A1 | 2/2018 | Aitoh et al. | |

FOREIGN PATENT DOCUMENTS

| | | | |
|---|---|---|---|
| CN | 102822658 | A | 12/2012 |
| EP | 2191928 | A1 | 6/2010 |
| EP | 3264062 | A1 | 1/2018 |
| JP | 2008-107322 | A | 5/2008 |
| JP | 4133956 | B2 | 8/2008 |
| JP | 4150383 | B2 | 9/2008 |
| JP | 2010-32477 | A | 2/2010 |
| JP | 4418384 | B2 | 2/2010 |
| JP | 2010-127933 | A | 6/2010 |
| JP | 2010-230644 | A | 10/2010 |
| JP | 4700559 | B2 | 6/2011 |
| JP | 4748131 | B2 | 8/2011 |
| JP | 2012-132902 | A | 7/2012 |
| JP | 5090426 | B2 | 12/2012 |
| JP | 5356164 | B2 | 12/2013 |
| JP | 2014-25892 | A | 2/2014 |
| JP | 2015-18306 | A | 1/2015 |
| JP | 5742685 | B2 | 7/2015 |
| WO | WO 02/41195 | A2 | 5/2002 |
| WO | WO 2011/126057 | A1 | 10/2011 |

OTHER PUBLICATIONS

Kapidžić et al., "Quasi-Static Bearing Failure of CFRP Composite in Biaxially Loaded Bolted Joints," Composite Structures, vol. 125, 2015 (published online Feb. 3, 2015), pp. 60-71.

Eisazadeh et al., "New Parametric Study of Nugget Size in Resistance Spot Welding Process Using Finite Element Method," Materials and Design, vol. 31, 2010 (Available online Jul. 1, 2009), pp. 149-157 (10 total pages).

Hou et al., "Finite Element Analysis for the Mechanical Features of Resistance Spot Welding Process," Journal of Materials Processing Technology, vol. 185, 2007, pp. 160-165.

Korean Notice of Allowance, dated May 9, 2019, for corresponding Korean Application No. 10-2017-7023865, with an English translation.

Japanese Notice of Allowance dated Mar. 27, 2018, for corresponding Japanese Application No. 2017-502294, with English translation.

Chinese Office Action, dated May 20, 2019 for Chinese Application No. 201680011853.2, with English translation.

International Search Report for PCT/JP2016/054552 dated May 10, 2016.

Written Opinion of the International Searching Authority for PCT/JP2016/054552 (PCT/ISA/237) dated May 10, 2016.

\* cited by examiner

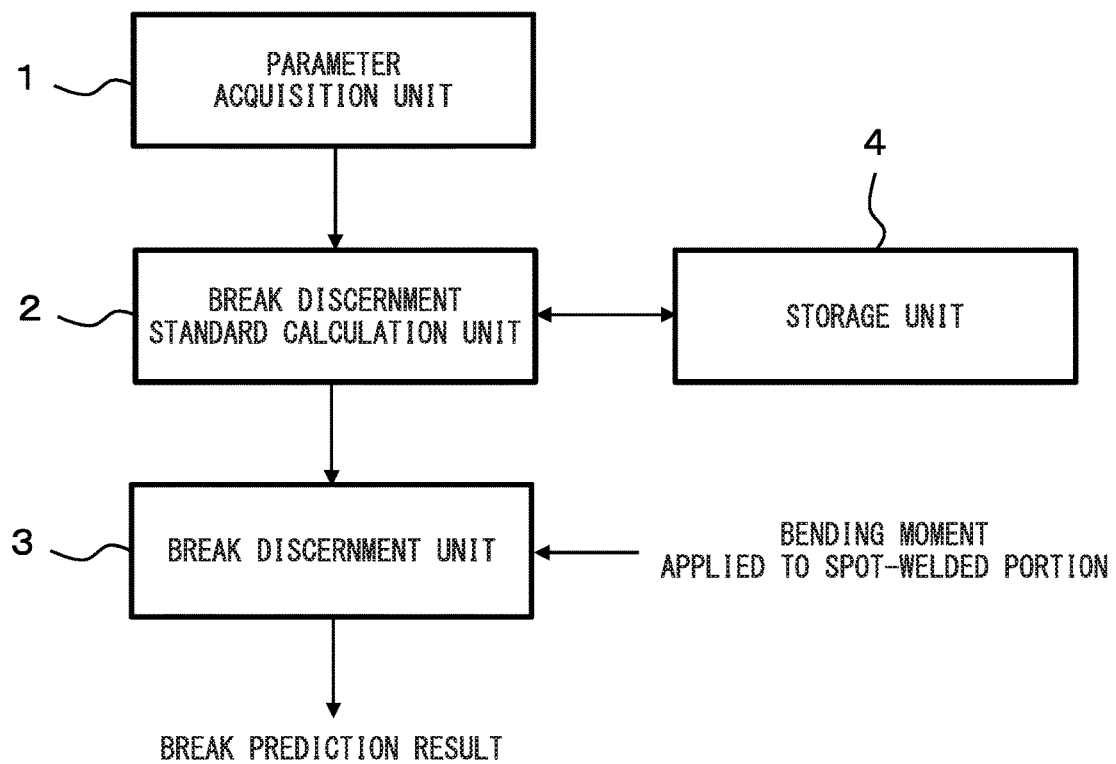
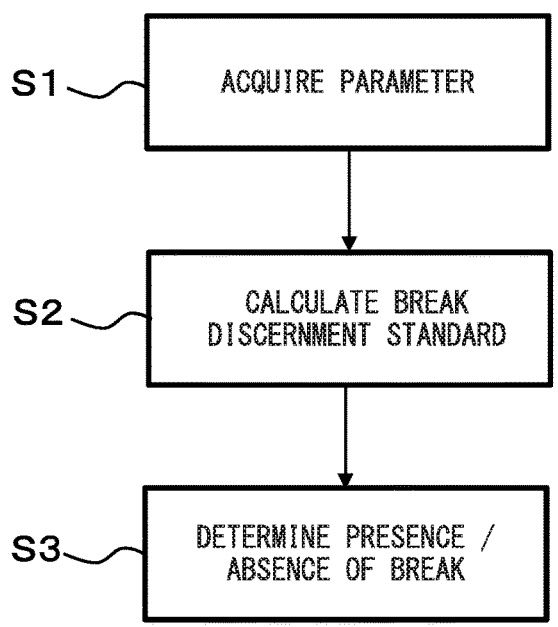

BREAK PREDICTION METHOD, BREAK PREDICTION DEVICE, PROGRAM, RECORDING MEDIUM, AND BREAK DISCERNMENT STANDARD CALCULATION METHOD

TECHNICAL FIELD OF THE INVENTION

The present invention relates to a break prediction method, a break prediction device, a program, a recording medium, and a break discernment standard calculation method.

This application claims priority to Japanese Patent Application No. 2015-037121, filed in Japan on Feb. 26, 2015, which is incorporated herein by reference.

RELATED ART

In recent years, in vehicle industries, the development of a vehicle body structure that can reduce the impact at the time of collision has become an urgent task. In this case, it is important for the structural members of a vehicle to absorb the impact energy. A main component that absorbs the impact energy at the time of collision of a vehicle has a structure in which members are formed by press forming and are formed into a closed cross section by spot welding. A spot-welded portion needs to ensure the strength that can maintain the closed section of the member without being easily broken at a complex deformation state at the time of collision and a load condition.

PRIOR ART DOCUMENT

Patent Document

[Patent Document 1] Japanese Patent No. 4150383
[Patent Document 2] Japanese Patent No. 4133956
[Patent Document 3] Japanese Patent No. 4700559
[Patent Document 4] Japanese Patent No. 4418384
[Patent Document 5] Japanese Patent No. 5742685
[Patent Document 6] Japanese Patent No. 4748131

DISCLOSURE OF THE INVENTION

Problems to be Solved by the Invention

As a method for measuring the break strength of the spot-welded portion, a shear joint type or a cross joint type tensile test is applied. The shear joint type test measures the strength when shear force is mainly applied to cause a break, and the cross joint type test measures the strength when an axial force is mainly applied to cause a break. In Patent Documents 1 to 3, methods of predicting a break of a spot-welded portion at each of the input forms have been studied. However, not only these input forms, but also break prediction in a break form causing a break by loading an evaluable moment in an L-shaped joint type tensile test are important. In a case of considering the deformation at the time of collision of the actual vehicle member, a complex deformation occurs, not only a shear force and an axial force, but also the moment has also been loaded a spot-welded portion, and there is a problem that sufficient prediction accuracy is not obtained by a break prediction method of a spot-welded portion which is obtained based on the shear joint type or cross joint type tensile test.

Patent Document 4 describes break prediction of an L-shaped joint. However, in this case, high-tensile material having a relatively low-strength is targeted, and it has been found that the prediction accuracy is inferior for ultra-high-tensile material (tensile strength 980 MPa or more) in recent years. Further, in a simulation of an L-shaped joint using a finite element method (FEM), even in a model of a test piece of the same shape, it has been found that the value of a bending moment occurring in a spot-welded portion changes depending on the element (mesh) size of the base material portion used. Therefore, there is a problem that a timing of determining a break varies depending on the element size of the base material portion of the model on which a collision deformation analysis is performed, and the prediction accuracy is inferior. It is also found that this problem becomes more noticeable in a model in which a moment is mainly loaded to cause a break, compared to a model in which a shear force or an axial force is mainly applied to a spot-welded portion to cause a break.

Patent Document 5 describes a method for predicting a break of a spot welding joint. A break determination value is determined for each material parameter specified from the mechanical properties and chemical components of a kind of steel, an approximate master curve of the break determination value is generated from the distribution, and the breaks of a base material portion, a HAZ part, and a nugget part are predicted. As described above, even in models of the same material and same shape, since the strain and stress generated in each element change depending on the element size of the base material portion used, there is a problem that a timing of determining a break varies depending on the element size of the base material portion of the model on which a collision deformation analysis is performed, and the prediction accuracy is inferior.

Patent Document 6 discloses a method of obtaining a breaking strain of a base material portion around a spot-welded portion or a heat affected part, from the value of the element size parameter defining the element size of the base material portion. In this case, since it is necessary to determine the relationship between the element size parameter and the breaking strain by using a model of a specific material and thickness, and it can only be applied to break prediction of a model of the same material and same thickness as those of the model for which the relationship is determined, there is a problem that break prediction cannot be performed for a model of any material and thickness. Further, such a technique merely determines the breaking strain of the base material portion including the heat affected part around the spot-welded portion, and does not directly predict break of the spot-welded portion which is a joint portion.

The present invention has been made in view of the above problems, and an object is to provide a break prediction method, a break prediction device, a program, a recording medium, and a break discernment standard calculation method, which each is capable of stably obtaining high break prediction accuracy without depending on the element size of the base material portion, when predicting a break of a joint portion of an object to be analyzed including a pair of members joined to each other (in particular, a break caused by the application of a moment to the joint portion), for example, a break from a spot-welded portion in a collisional deformation analysis of a vehicle by using a finite element method.

Means for Solving the Problem

The present invention adopts the following means to solve the above problems and to achieve the object.

(1) A break prediction method according to an aspect of the present invention is a method for predicting a break of a joint portion of an object to be analyzed including a pair of members joined to each other by using a finite element method, and includes a first step of acquiring at least an element size of a base material portion, from among parameters set in an element model for the object to be analyzed; a second step of calculating, as a break discernment standard, a break limit moment defined by a function including the element size of the base material portion as a variable; and a third step of discerning whether the moment applied to the joint portion in a deformation analysis of the element model for the object to be analyzed exceeds the break limit moment, and outputting the result of the discernment as a break prediction result for the joint portion.

(2) A break prediction device according to another aspect of the present invention is a device which predicts a break of a joint portion of an object to be analyzed including a pair of members joined to each other by using a finite element method, and includes parameter acquisition unit that acquires at least the element size of a base material portion, from among parameters set in an element model for the object to be analyzed; a storage unit that stores a break limit moment defined by a function including the element size of the base material portion as a variable; a break discernment standard calculation unit that calculates the break limit moment as a break discernment standard, by reading the function from the storage unit and inputting the element size of the base material portion which is acquired by the parameter acquisition unit to the function; and a break discernment unit that discerns whether the moment applied to the joint portion in a deformation analysis of the element model for the object to be analyzed exceeds the break limit moment, and outputs the result of the discernment as a break prediction result for the joint portion.

(3) A program according to still another aspect of the present invention is a program causing a computer to execute a process of predicting a break of a joint portion of an object to be analyzed including a pair of members joined to each other by using a finite element method, and causes a computer to execute a first process of acquiring at least an element size of a base material portion, from among parameters set in an element model for the object to be analyzed; a second process of calculating, as a break discernment standard, a break limit moment defined by a function including the element size of the base material portion as a variable; and a third process of discerning whether the moment applied to the joint portion in a deformation analysis of the element model for the object to be analyzed exceeds the break limit moment, and outputting the result of the discernment as a break prediction result for the joint portion.

(4) A recording medium according to further still another aspect of the present invention is a recording medium having the program according to (3) readable by a computer recorded therein.

(5) A break discernment standard calculation method according to further still another aspect of the present invention is a method which calculates a break discernment standard used when predicting a break of a joint portion of an object to be analyzed including a pair of members joined to each other by using a finite element method, and includes a first process of acquiring at least the element size of a base material portion, from among parameters set in an element model for the object to be analyzed; and a second process of calculating, as a break discernment standard, a break limit moment defined by a function including the element size of the base material portion as a variable.

Effects of the Invention

According to the aspects described above, it is possible to stably obtain high accuracy without depending on the element size of the base material portion, when predicting a break of a joint portion of an object to be analyzed including a pair of members joined to each other (in particular, a break caused by the application of a moment to the joint portion) by using a finite element method. Thus, in a case where a collision deformation analysis of a vehicle is executed on a computer, it is possible to perform accurately break prediction of spot welding, such that it is possible to accurately design a member for preventing break at the time of collision on the computer. As a result, it is possible to omit the collision test in an actual vehicle or greatly reduce the number of collision tests, which can contribute to a significant cost reduction and shortening of the development period.

BRIEF DESCRIPTION OF THE DRAWINGS

FIG. 1 is a schematic diagram showing a schematic configuration of a break prediction device according to an embodiment of the present invention.

FIG. 2 is a flowchart showing a break prediction method according to an embodiment of the present invention in a step order.

EMBODIMENTS OF THE INVENTION

Figure 3A:
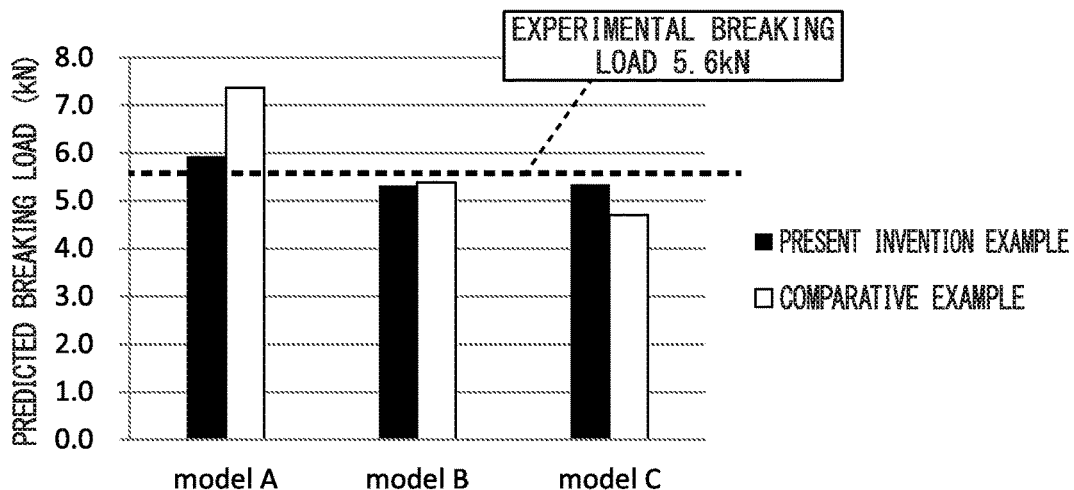
FIG. 3A is a diagram showing a result of investigating a relationship between a predicted breaking load obtained by the break prediction method according to the embodiment of the present invention and an experimental breaking load obtained by experiment, in a case where the tensile strength of an L-shaped joint which is an object to be analyzed is equal to or greater than 980 MPa.

Hereinafter, an embodiment of the present invention will be described in detail with reference to the drawings.

In the present embodiment, a break (in particular, a break caused by the application of a moment to the joint portion) of a joint portion of an object to be analyzed including a pair of members joined to each other is predicted by using a finite element method. In the element model, the base material portion is a shell element or a solid element, and the joint portion is a beam element, a solid element, or a shell element. In the present embodiment, an L-shaped joint type test piece including a pair of L-shaped steel plates joined by spot welding is exemplified as the object to be analyzed, and a case of predicting a break of a spot-welded portion of the test piece will be described. In order to stably obtain high break prediction accuracy without depending on the element (mesh) size using FEM, the break prediction method according to the present embodiment includes a first step of acquiring at least an element size of a base material portion, from among parameters set in an element model of an L-shaped joint type test piece; a second step of calculating, as a break discernment standard, a break limit moment defined by a function including the element size of the base material portion as a variable; and a third step of discerning whether the moment applied to the spot-welded portion in a deformation analysis of the element model for the object to be analyzed exceeds the break limit moment, and outputting the result of the discernment as a break prediction result for the spot-welded portion.

In order to increase the break prediction accuracy, it is preferable that in the first step, the tensile strength of the base material portion of the L-shaped joint type test piece is acquired together with the element size of the base material portion, among the parameters set in the element model of an L-shaped joint type test piece, and in the second step, the function used to calculate the break limit moment varies depending on the tensile strength.

For example, in a case where the tensile strength of the L-shaped joint type test piece is 980 MPa or more (in a case where the base material of the L-shaped joint type test piece is ultra-high-tensile material), in the second step, the break limit moment is calculated by using Equation (1) as the function.

$$Mf = Me \cdot F(Me, t, D, W, L, e) \tag{1}$$

where, Mf: break limit moment (N mm)
Me: modified elastic bending moment (N mm)
F(Me, t, D, W, L, e): correction terms
t: thickness of a base material of an L-shaped joint type test piece (mm)
D: nugget diameter of a spot-welded portion (mm)
W: effective width that a spot-welded portion receives a load (mm)
L: arm length (mm)
e: an element size of a base material portion (mm)

In Equation (1), the modified elastic bending moment Me may be defined by Equation (2), and the correction terms F(Me, t, D, W, L, e) may be defined by Equation (3).

$$Me = (el/L) \cdot (E \cdot D \cdot t^3)/12 \tag{2}$$

where, el: total elongation of the base material of the L-shaped joint type test piece ($\varepsilon$)
E: Young's modulus of a base material of the L-shaped joint type test piece (MPa)
F(Me, t, D, W, L, e)

$$= F(Me) \cdot f(t) \cdot f(D) \cdot f(W) \cdot f(L) \cdot f(e) \tag{3}$$

where, f(Me): correction term of the modified elastic bending moment Me
f(t): correction term of the thickness t
f(D): correction term of the nugget diameter D
f(W): correction term of the effective width W
f(L): correction term of the arm length L
f(e): correction term of the element size e of the base material portion In a case where the tensile strength of the L-shaped joint type test piece is 980 MPa or more, the break limit moment is corrected based on the modified elastic bending moment, but the modified elastic bending moment will be described below.

In a case where the tensile strength of the L-shaped joint type test piece is 980 MPa or more, plastic deformation is observed locally in the vicinity of the spot-welded portion, but it is found that the joint is almost in the elastic deformed state as a whole, and a spot-welded portion is broken. From this, it is found that in materials having a tensile strength of 980 MPa or more, as a result of examining the relationship between a break limit moment and an elastic bending moment, it becomes clear that there is a certain correlation. Although the general equation of an elastic bending moment is $(1/\rho) \cdot (E \cdot W \cdot t^3)/12$, it is difficult to obtain the curvature $(1/\rho)$ of the base material of the spot-welded portion at the time of break occurrence as a parameter from an element model of an object to be analyzed. Therefore, in order to replace the curvature with the value of an obtainable parameter, as a result of investigating the relation of each parameter, it is found out that the product of the curvature and the arm length is proportional to the total elongation of base material. Therefore, the curvature $(1/\rho)$ is replaced by the value (el/L) obtained by dividing the total elongation (el) of the base material by the arm length (L). Further, in a case where the tensile strength is 980 MPa or more, since the effect of the test piece width on the break limit moment is small, and the distribution of strain in an FEM model of the L-shaped joint type test piece is concentrated in a spot-welded portion, the width W that receives a load matches the nugget diameter D, and W in the general equation of an elastic bending moment is replaced with the nugget diameter D. The modified elastic bending moment generated in this manner is corrected to include correction term of the element size, and thus the break limit moment is calculated.

On the other hand, for example, in a case where the tensile strength of the L-shaped joint type test piece is less than 980 MPa (in a case where the the tensile strength of a base material (steel plate) of the L-shaped joint type test piece is 780 MPa or less, as strength classification), in the second step, the break limit moment is calculated using Equation (4) as the function.

$$Mf = Mp \cdot F(Mp, t, D, W, el, e) \tag{4}$$

where, Mf: break limit moment (N·mm)
Mp: total plastic bending moment (N·mm)
F(Mp, t, D, W, el, e): correction terms
t: thickness of a base material of an L-shaped joint type test piece (mm)
D: nugget diameter of a spot-welded portion (mm)
W: effective width that a spot-welded portion receives a load (mm)
el: total elongation of the base material of the L-shaped joint type test piece ($\varepsilon$)
e: an element size of a base material portion (mm)

In Equation (4), the total plastic bending moment Mp is defined by Equation (5), and the correction terms F(Mp, t, D, W, el, e) are defined by Equation (6).

$$Mp = (TS \cdot W \cdot t^2)/4 \tag{5}$$

where, TS: tensile strength of the base material of the L-shaped joint type test piece (MPa)
F(Mp, t, D, W, el, e)

$$= f(Mp) \cdot f(t) \cdot f(D) \cdot f(W) \cdot f(el) \cdot f(e) \tag{6}$$

where, f(Mp): correction term of the total plastic bending moment Mp
f(t): correction term of the thickness t
f(D): correction term of the nugget diameter D
f(W): correction term of the effective width W
f(el): correction term of total elongation el
f(e): correction term of the element size e of the base material portion In a case where the test piece having a tensile strength less than 980 MPa is an object to be analyzed, it has been found that there is a certain correlation between the break limit moment and the total plastic bending moment, and the break limit moment is calculated by correcting to include a correction term of an element size based on the total plastic bending moment.

Hereinafter, a method of determining each correction term of Equation (3) and Equation (6) will be described.

First, in an FEM model generated using an L-shaped joint type test piece, the breaking load (maximum load) confirmed in an experiment is loaded on the test piece edge (chuck part), and the moment applied to a spot-welded portion is acquired as the break limit moment. The acquisition of the break limit moment is performed by various kinds of steel, a thickness, an L-shaped joint shape, a nugget diameter, the element size of a base material portion, or the like.

Subsequently, each correction term is determined from each multiple regression obtained such that an error between the break limit moment obtained as described above and the break limit moment calculated by Equation (3) or (6) is minimized. Specifically, each correction term is defined as follows. The equation form of the correction term is not particularly limited, and for example, a quadratic equation may be used instead of the linear equation.

1. In a case where a test piece having a tensile strength of 980 MPa or more is an object to be analyzed $$f(Me)=(A1/Me)+A2$$

$$f(t)=B1 \cdot t+B2$$

$$f(D)=C1 \cdot D+C2$$

$$f(W)=D1 \cdot W+D2$$

$$f(L)=E1 \cdot L+E2$$

$$f(e)=F1 \cdot e+F2 \qquad (7)$$

2. In a case where a test piece having a tensile strength less than 980 MPa is an object to be analyzed $$f(Mp)=(a1/Mp)+a2$$

$$f(t)=b1 \cdot t+b2$$

$$f(D)=c1 \cdot D+c2$$

$$f(W)=d1 \cdot W+d2$$

$$f(el)=el \cdot (e1)+e2$$

$$f(e)=f1 \cdot e+f2 \qquad (8)$$

As described above, respective coefficients A1, A2, B1, B2, C1, C2, D1, D2, F1 and F2 in Equation (7) and respective coefficients a1, a2, b1, b2, c1, c2, d1, d2, e1, e2, f1 and f2 of Equation (8) are determined such that an error between the break limit moment obtained in the FEM model and the break limit moment calculated by Equation (3) or (6) is minimized, and the break limit moment Mf of Equation (3) or (6) is obtained.

In connection with the present embodiment, in an FEM model generated using an L-shaped joint type test piece, the breaking load (maximum load) confirmed in an experiment is loaded on the test piece edge (chuck part), the moment applied to a spot-welded portion is acquired, and the value is directly used as the break limit moment. However, there are numerous combinations of conditions (the kind of steel, the thickness, the shape, the nugget diameter, the element size of a base material portion, or the like) of an L-shaped joint for which the user actually tries to predict a break by simulation. It is impossible to perform experiment with all these combinations and obtain a breaking load (maximum load). Therefore, in the present embodiment, a break is predicted by using the above equation (3) or (6).

FIG. 1 is a schematic diagram showing a schematic configuration of a break prediction device according to the present embodiment. FIG. 2 is a flowchart showing a break prediction method according to the present embodiment in a step order.

As shown in FIG. 1, the break prediction device according to the present embodiment includes a parameter acquisition unit 1, a break discernment standard calculation unit 2, a break discernment unit 3, and a storage unit 4.

The break prediction device according to the present embodiment can be realized by a computer such as a personal computer. The storage unit 4 is a nonvolatile storage device such as a flash memory, a hard disk, or a read only memory (ROM) provided in such a computer.

The parameter acquisition unit 1, the break discernment standard calculation unit 2, and the break discernment unit 3 are functions realized when an arithmetic processing unit (not shown in FIG. 1) such as a central processing unit (CPU) provided in the computer operates according to the program stored in the storage unit 4.

Here, the program is application software constructed with a computer-readable machine language to realize the above break prediction method according to the present embodiment by a computer. The program can be stored in the storage unit 4 by downloading the program from a portable recording medium such as a universal serial bus (USB) memory or a CD-ROM to the computer.

For example, in a case of predicting break of a spot-welded portion in collision FEM analysis of a hat type member (L-shaped joint type members) joined by spot welding, LS-DYNA which is general purpose collision analysis software is used as a main routine program, and it is possible to link the program to LS-DYNA as a subroutine program of LS-DYNA. That is, the arithmetic processing unit of a computer (break prediction device) operates in accordance with the main routine program LS-DYNA to perform a collision deformation analysis process of a hat type member which is an object to be analyzed, and operates in accordance with the program which is a subroutine program to perform a break prediction process of determining whether or not a break occurs in the spot-welded portion while interlocking with the collision deformation analysis process.

Therefore, not only the program but also LS-DYNA which is the main routine program are stored in the storage unit 4. In addition, LS-DYNA may be stored in a storage unit different from the storage unit 4. Further, other programs necessary for the operation of a computer, such as the operating system (OS) program, may be stored in the storage unit 4, or may be stored in a storage unit different from the storage unit 4.

Further, each correction term of Equation (7) where each of coefficients A1, A2, B1, B2, C1, C2, D1, D2, F1 and F2 is determined, and each correction term of Equation (8) where each of coefficients a1, a2, b1, b2, c1, c2, d1, d2, e1, e2, f1 and f2 is determined, and Equations (1) to (6) are stored in the storage unit 4. These data items can be stored in the storage unit 4 by downloading these data items together with the program from a portable recording medium such as a USB memory or a CD-ROM to the computer.

Hereinafter, with reference to FIG. 2, the break prediction method (functions of the parameter acquisition unit 1, the break discernment standard calculation unit 2, and the break discernment unit 3) realized by the arithmetic processing unit of the break prediction device (computer) operating in accordance with the program will be described.

As shown in FIG. 2, the parameter acquisition unit 1 acquires a tensile strength TS, a Young's modulus E, an effective width W, a thickness t, a nugget diameter D, an arm length L, a total elongation el, and an element size e of the base material portion, from among parameters set in an element model of a hat type member (step S1: first process).

As described above, the arithmetic processing unit of the break prediction device executes a collision deformation analysis process of a hat type member based on LS-DYNA and a break prediction process based on the program in parallel. In order to execute the collision deformation analysis process of a hat type member based on LS-DYNA, it is necessary to prepare an element model of the hat type member in advance, and therefore it is necessary to set various parameters. Therefore, the parameter acquisition unit 1 can easily acquire the tensile strength TS, the Young's modulus E, the effective width W, the thickness t, the nugget diameter D, the arm length L, the total elongation el, and the element size e of the base material portion, from among various parameters previously set to generate an element model of a hat type member.

In addition, these parameters may be data input by the input device (not shown in FIG. 1) provided in the break prediction device, at the start of the execution of the break prediction process based on the program.

Further, in step S1, the average element size around the spot-welded portion may be acquired as the element size e of the base material portion, by automatically reading various parameters of the element model of a hat type member which is the object to be analyzed from the input file for collision analysis, using input auxiliary software, and searching for the elements of a base material portion connected to the spot-welded portion.

Next, the break discernment standard calculation unit 2 calculates the break limit moment Mf as a break discernment standard (step S2: second process).

Specifically, in a case where the tensile strength TS acquired in step S1 is 980 MPa or more, the break discernment standard calculation unit 2 reads Equations (1) to (3) and each correction term of Equation (7) where each of coefficients A1, A2, B1, B2, C1, C2, D1, D2, F1 and F2 is determined, from the storage unit 4, and calculates the break limit moment Mf, by substituting the Young's modulus E, the effective width W, the thickness t, the nugget diameter D, the arm length L, the total elongation el, and the element size e of the base material portion into each equation, among the parameters acquired in step S1.

On the other hand, in a case where the tensile strength TS acquired in step S1 is less than 980 MPa, the break discernment standard calculation unit 2 reads Equations (4) to (6) and each correction term of Equation (8) where each of coefficients a1, a2, b1, b2, c1, c2, d1, d2, e1, e2, f1 and f2 is determined, from the storage unit 4, and calculates the break limit moment Mf, by substituting the tensile strength TS, the effective width W, the thickness t, the nugget diameter D, the total elongation el, and the element size e of the base material portion into each equation, among the parameters acquired in step S1.

Next, the break discernment unit 3 determines whether or not the bending moment applied to the spot-welded portion in the collision deformation analysis of the element model of the hat type member exceeds the break limit moment Mf obtained in step S2, and outputs the determination result as the break prediction result of the spot-welded portion (step S3: third process).

Specifically, in a case where the bending moment M1 applied to the spot-welded portion in the collision deformation analysis of the element model of the hat type member and the break limit moment Mf satisfies Equation (9), the break discernment unit 3 outputs a result indicating that there is a break, as the break prediction result.

$$M1/Mf \gtrsim 1 \qquad (9)$$

The bending moment M1 applied to the spot-welded portion in the collision deformation analysis of an element model of a hat type member can be obtained from the result of the collision deformation analysis process of a hat type member based on LS-DYNA.

In a case where the break prediction result output from the break discernment unit 3 indicates that there is a break, the arithmetic processing unit of the break prediction device deletes the spot-welded portion included in the element model of a hat type member, in the collision deformation analysis process of a hat type member based on the LS-DYNA, so as to inform the user that a break has occurred in the spot-welded portion.

On the other hand, in a case where the break prediction result output from the break discernment unit 3 indicates that there is no break, the arithmetic processing unit of the break prediction device leaves the spot-welded portion included in the element model of the hat type member, in the collision deformation analysis process of a hat type member based on the LS-DYNA, so as to inform the user that there is no break in the spot-welded portion.

Figure 3B:
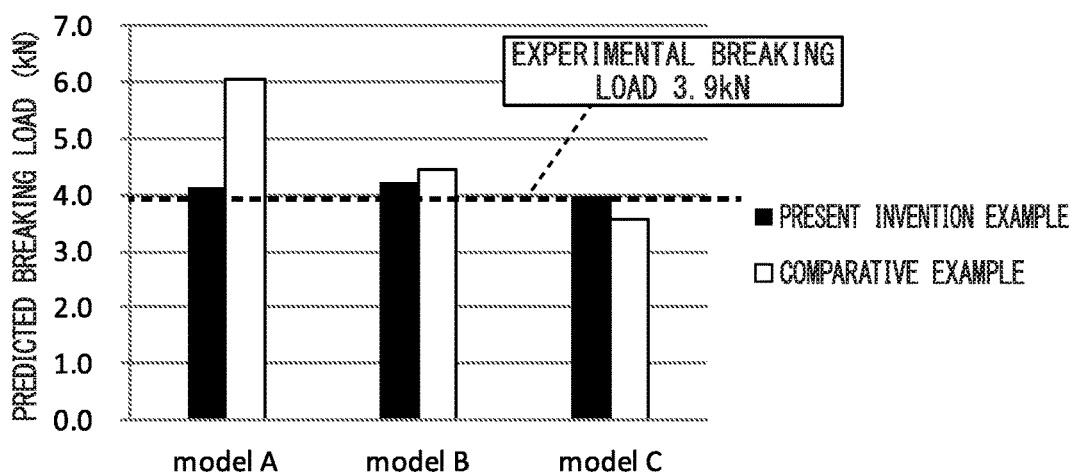
FIG. 3B is a diagram showing a result of investigating a relationship between a predicted breaking load obtained by the break prediction method according to the embodiment of the present invention and an experimental breaking load obtained by experiment, in a case where the tensile strength of an L-shaped joint which is an object to be analyzed is less than 980 MPa.

FIG. 3A and FIG. 3B show a result of investigating the relationship between the load (maximum load) immediately before the start of load reduction, which is determined as a break in the present embodiment, and the experimental breaking load (maximum load) obtained by experiments by using the tensile test model of an L-shaped joint of which the base material portion is made of a shell element and the spot-welded portion is made of a solid element, in the tensile test of an L-shaped joint as an example. FIG. 3A shows a case where the tensile strength of an L-shaped joint which is an object to be analyzed is equal to or greater than 980 MPa, and FIG. 3B shows a case where the tensile strength of an L-shaped joint which is an object to be analyzed is less than 980 MPa.

A present invention example and a comparative example in FIG. 3A are common in analysis performed under the condition that the tensile strength TS is 1057 MPa, the Young's modulus E is 205800 MPa, the effective width W is 40 mm, the thickness t is 1.6 mm, the nugget diameter D is 6.3 mm, the arm length L is 10 mm, and the total elongation el is 0.15.

In each of the present invention example and the comparative example in FIG. 3A, the tensile test analysis is performed using an analysis model (model A) prepared so that the element size e (average value) of the base material portion is 3.0 mm, an analysis model (model B) prepared so that the element size e (average value) of the base material portion is 4.7 mm and an analysis model (model C) prepared so that the element size e (average value) of the base material portion is 5.8 mm.

Whereas the predicted breaking load is calculated based on the break limit moment calculated using the functions (see Equations (1) to (3)) including the element size e of the base material portion as a variable in the present invention example in FIG. 3A, the predicted breaking load is calculated based on the break limit moment calculated using the function not including the element size e of the base material portion as a variable in the comparative example. Specifically, in the comparative example, the break limit moment is not corrected by the element size e of the base material portion, by inputting a fixed value of 5 mm to the correction term f(e) in any of "model A", "model B", and "model C".

A present invention example and a comparative example in FIG. 3B are common in the analysis performed under the condition that the tensile strength TS is 467 MPa, the effective width W is 50 mm, the thickness t is 1.6 mm, the nugget diameter D is 5.0 mm, and the total elongation el is 0.36.

In each of the present invention example and the comparative example in FIG. 3B, the tensile test analysis is performed using an analysis model (model A) prepared so that the element size e (average value) of the base material portion is 3.0 mm, an analysis model (model B) prepared so that the element size e (average value) of the base material portion is 4.7 mm and an analysis model (model C) prepared so that the element size e (average value) of the base material portion is 5.8 mm.

Whereas the predicted breaking load is calculated based on the break limit moment calculated using the functions (see Equations (4) to (6)) including the element size e of the base material portion as a variable in the present invention example in FIG. 3B, the predicted breaking load is calculated based on the break limit moment calculated using the function not including the element size e of the base material portion as a variable in the comparative example. Specifically, in the comparative example, the break limit moment is not corrected by the element size e of the base material portion, by inputting a fixed value of 5 mm to the correction term f(e) in any of "model A", "model B", and "model C".

As shown in FIG. 3A and FIG. 3B, in the example of the present invention, while the deviation between the predicted breaking load and the experimental breaking load (5.6 kN or 3.9 kN) is also small in any condition that the element size e of the base material portion of the tensile test model of an L-shaped joint is different, there is a case where the deviation between the predicted breaking load and the experimental breaking load is large depending on the element size e of the base material portion of the tensile test model of an L-shaped joint in the comparative example.

In other words, according to the present invention example, the analysis results in FIG. 3A and FIG. 3B show that high break prediction accuracy can be stably obtained without depending on the element size e of the base material portion, when predicting a break of a spot-welded portion of an L-shaped joint which is an object to be analyzed (in particular, a break caused by the application of a moment to the spot-welded portion) by using a finite element method.

As described above, according to the present embodiment, it is possible to stably obtain high break prediction accuracy without depending on the element size of the base material portion, when predicting a break of a joint portion (for example, a spot-welded portion) of an object to be analyzed (for example, a hat type member) including a pair of members joined to each other (in particular, a break caused by the application of a moment to the joint portion) by using a finite element method.

As described above, the function of each component of the break prediction device according to the present embodiment (the parameter acquisition unit 1, the break discernment standard calculation unit 2, and the break discernment unit 3 in FIG. 1), and the break prediction method (first to third steps) according to the present embodiment can be realized by the arithmetic processing unit operating according to the program stored in the nonvolatile storage device of the computer. The program and the computer readable recording medium having the program recorded therein are included in the present embodiment.

Specifically, the program is recorded in a recording medium such as a CD-ROM, or provided to a computer through various transmission media. As a recording medium having the program recorded therein, in addition to a CD-ROM, a flexible disk, a hard disk, a magnetic tape, a magneto-optical disk, a nonvolatile memory card, or the like can be used. On the other hand, as the transmission medium of a program, it is possible to use a communication medium in a computer network system for propagating and providing program information as a carrier wave. Here, the computer network is a local area network (LAN), a wide area network (WAN) such as the Internet, a wireless communication network or the like, and the communication medium is a wired line such as an optical fiber or a wireless line.

Further, the program included in the present embodiment is not limited to the one in which the function of the present embodiment is realized by the computer executing the supplied program. For example, in a case where the function of the present embodiment is realized in cooperation with an operating system (OS) or other application software running on the computer, such program is included in the present embodiment. Further, in a case where all or part of the process of the supplied program is performed by a function expansion board or a function expansion unit of the computer to realize the function of the present embodiment, such a program is included in the present embodiment.

Figure 4:
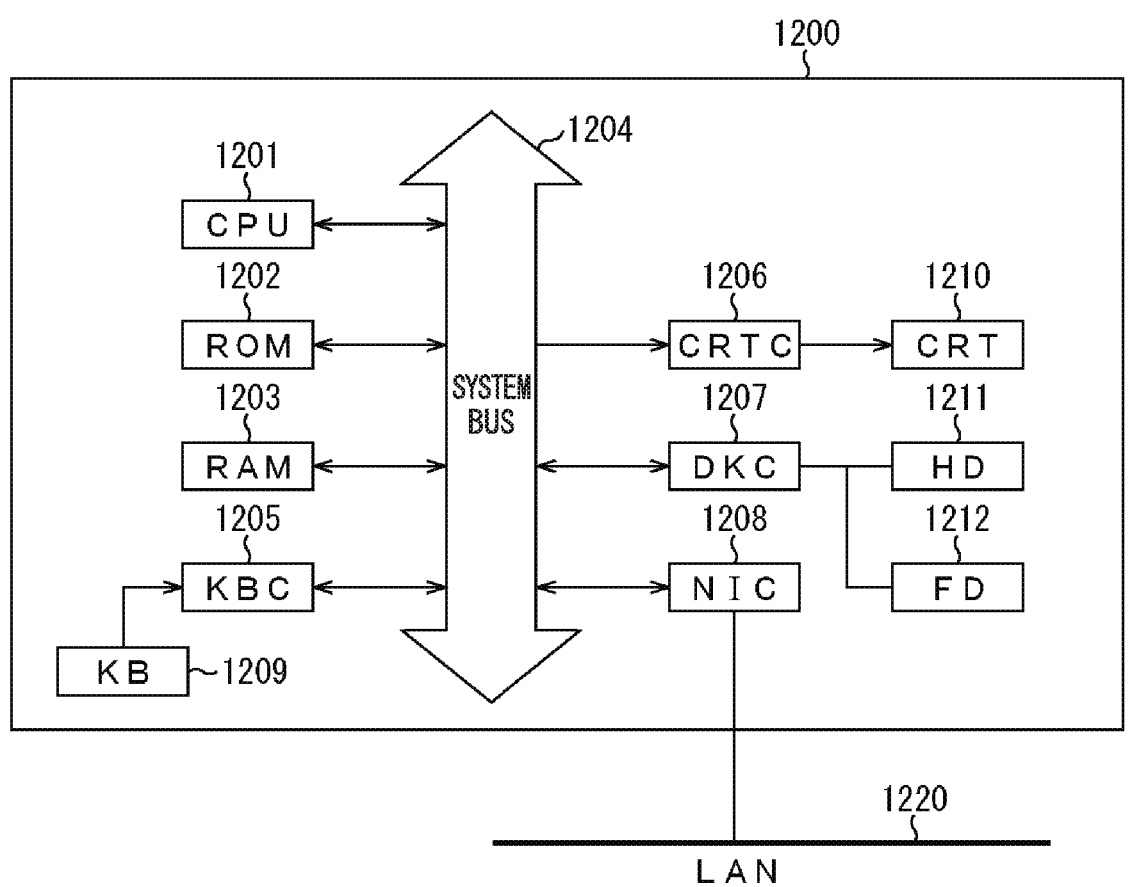
FIG. 4 is a schematic diagram showing an internal structure of a personal user terminal device.

For example, FIG. 4 is a schematic diagram showing an internal structure of a personal user terminal device. In FIG. 4, reference numeral 1200 denotes a personal computer (abbreviated as a PC) provided with a CPU 1201. The PC 1200 executes device control software stored in the ROM 1202 or a hard disk (abbreviated as HD) 1211 or supplied from a flexible disk drive (abbreviated as FD) 1212. The PC 1200 collectively controls each device connected to the system bus 1204.

By the program stored in the CPU 1201, the ROM 1202 or the HD 1211 of the PC 1200, the procedures of the steps S1 to S3 in FIG. 2 of the present embodiment are realized.

Reference numeral 1203 denotes a random access memory (RAM), which functions as a main memory, a work area, and the like of the CPU 1201. Reference numeral 1205 denotes a keyboard controller (abbreviated as KBC), and controls an instruction input from a keyboard (abbreviated as KB) 1209 or a device not shown.

Reference numeral 1206 denotes a CRT controller (abbreviated as CRTC), which controls the display of a CRT display (abbreviated as CRT) 1210. Reference numeral 1207 denotes a disk controller (abbreviated as DKC). The DKC 1207 controls access to the HD 1211 and the FD 1212 that store a boot program, a plurality of applications, an editing file, a user file, and a network management program or the like. Here, the boot program is an activation program for starting the execution (operation) of the hardware and software of the PC 1200.

Reference numeral 1208 denotes a network interface card (abbreviated as NIC), which bidirectionally communicates data with a network printer, another network device, or another PC through the LAN 1220.

Instead of using the PC 1200 which is a personal user terminal device, a predetermined calculator or the like specialized for a break prediction device may be used.

It should be noted that the present invention is not limited to the above embodiment, and the following modifications are conceivable.

(1) In the above embodiment, a description has been made on a method for predicting a break of a joint portion of an object to be analyzed including a pair of members joined to each other, in particular, a break caused by the application of a moment to the joint portion by using a finite element method.

However, it is generally known that not only moment but also shear force and axial force are added to a joint portion, in collision deformation analysis of an object to be analyzed. Therefore, in the break prediction method in the related art, a break caused by the moment, a break caused by the shear force, and a break caused by the axial force are predicted using separate break prediction equations, respectively.

The break prediction method (program) according to the above embodiment can be used as a method (subroutine program) for predicting a break caused by a moment, out of the above three break modes, but in a case where the axial force applied to the joint portion is the compressed axial force, a break does not occur at the time of actual collision, the moment may occur even under the compressed axial force, and there is a possibility of erroneously predicting the occurrence of a moment break.

Therefore, in the third step of the break prediction method according to the present embodiment, in the collision deformation analysis of an object to be analyzed, in a case where the axial force applied to the joint portion is a compressed axial force, it is preferable that a result indicating that there is no break is forcibly output as the break prediction result.

In other words, in step S3, in a case where the axial force applied to a joint portion in the collision deformation analysis of an object to be analyzed is a compressed axial force, it is preferable that the break discernment unit 3 of the break prediction device according to the break prediction device forcibly outputs a result indicating that there is no break as the break prediction result.

This makes it possible to prevent erroneous prediction that the moment that should not occur at the time of actual collision occurs in numerical analysis and a moment break occurs, in a case where the axial force applied to the joint portion is a compressed axial force.

(2) In the above embodiment, the object to be analyzed in which a pair of members is spot-welded is exemplified, and the case of predicting the moment break of the spot-welded portion is exemplified. The joint portion in the present invention is not limited to the spot-welded portion, and the present invention can also be applied to, for example, a case of predicting the moment break occurring in the joint portion of the object to be analyzed including a pair of members joined by other welding methods such as spot welding or line welding.

(3) In the above embodiment, the case where the object to be analyzed is a steel plate is exemplified, but the material of the object to be analyzed in the present invention is not limited to a steel plate, and the present invention can also be applied to a case of predicting the moment break of the object to be analyzed of which material is iron, aluminum, titanium, stainless steel, a composite material (metal-resin material or dissimilar metal material), carbon fiber or the like.

(4) In the above embodiment, the case is exemplified where the break limit moment is calculated by separately using two types of functions (a function used in a case where the tensile strength is 980 MPa or more and a function used in a case where the tensile strength is less than 980 MPa), but three or more functions may be used separately depending on the tensile strength.

(5) The present invention can be applied not only to structural members of vehicles such as hat type members, but also as a method for predicting the moment break of structural members such as various vehicles including railway vehicles, general machinery, or ships.

(6) In the above embodiment, a description has been made on a method for predicting a break of a joint portion of an object to be analyzed including a pair of members joined to each other, in particular, a break caused by the application of a moment to the joint portion by using a finite element method. However, there may be users who request only the method (program) for calculating the break discernment standard.

In response to such a request from the user, a break discernment standard calculation method obtained by deleting the third step from the break prediction method according to the above embodiment may be provided.

That is, the break discernment standard calculation method is a method which calculates a break discernment standard used when predicting a break of a joint portion of an object to be analyzed including a pair of members joined to each other by using a finite element method, and includes a first step of acquiring at least an element size of a base material portion, from among parameters set in an element model for the object to be analyzed; and a second step of calculating, as a break discernment standard, a break limit moment defined by a function including the element size of the base material portion as a variable.

BRIEF DESCRIPTION OF THE REFERENCE SYMBOLS

1 PARAMETER ACQUISITION UNIT
2 BREAK DISCERNMENT STANDARD CALCULATION UNIT
3 BREAK DISCERNMENT UNIT
4 STORAGE UNIT

The invention claimed is:
1. A break prediction method which predicts a break of a joint portion of an object to be analyzed including a pair of members joined to each other by using a finite element method, the method comprising:
 a first step of acquiring at least an element size of a base material portion, from among parameters set in an element model for the object to be analyzed;
 a second step of calculating, as a break discernment standard, a break limit moment based on at least the element size of the base material portion;
 a third step of discerning whether the moment applied to the joint portion in a deformation analysis of the element model for the object to be analyzed exceeds the break limit moment, and outputting a result of the discernment as a break prediction result for the joint portion, and
 a step of designing a structure of the joint portion of the object for preventing break at the time of collision based on the base material and the break prediction result for the joint portion,
 wherein in the first step, from among the parameters set in the element model, a tensile strength of the object to be analyzed and the element size of the base material portion are acquired; and wherein in the second step, the calculation of the break limit moment is changed depending on the tensile strength, wherein in a case where the tensile strength is equal to or greater than 980 MPa, in the second step, the break limit moment is calculated by using Equation (1), $$Mf = Me \cdot F(Me, t, D, W, L, e) \quad (1)$$

where, Mf: break limit moment (N·mm)
Me: modified elastic bending moment (N·mm)
F (Me, t, D, W, L, e): correction terms
    t: thickness of the object to be analyzed (mm)
    D: nugget diameter in a case where a joint portion is a spot-welded portion (mm)
    W: effective width that a spot-welded portion receives a load (mm)
    L: arm length (mm)
    e: an element size of a base material portion (mm), and wherein in Equation (1), the modified elastic bending moment Me is defined by Equation (2), the correction terms F(Me, t, D, W, L, e) are defined by Equation (3), $$Me = (el/L) \cdot (E \cdot D \cdot t^3)/12 \quad (2)$$

where, el: total elongation of an object to be analyzed ($\varepsilon$)
E: Young's modulus of the object to be analyzed (MPa)

$$F(Me, t, D, W, L, e) = f(Me) \cdot f(t) \cdot f(D) \cdot f(W) \cdot f(L) \cdot f(e) \quad (3)$$

where, f(Me): correction term of the modified elastic bending moment Me
f(t): correction term of the thickness t
f(D): correction term of the nugget diameter D
f(W): correction term of the effective width W
f(L): correction term of the arm length L
f(e): correction term of the element size e of the base material portion.

2. The break prediction method according to claim 1, wherein f(Me), f(t), f(D), f(W), f(L), and f(e) are equations which are determined from multiple regression such that an error between a moment applied to a spot-welded portion, obtained by loading a breaking load which is confirmed by experiments to a test piece edge and the break limit moment Mf calculated using Equation (1) is minimized, in a finite element method model generated using an L-shaped joint type test piece.

3. The break prediction method according to claim 1, wherein in a case where the tensile strength is less than 980 MPa, in the second step, the break limit moment is calculated using Equation (4), $$Mf = Mp \cdot F(Mp, t, D, W, el, e) \quad (4)$$

where, Mf: break limit moment (N·mm)
Mp: total plastic bending moment (N·mm)
F(Mp, t, D, W, el, e): correction terms
    t: thickness of the object to be analyzed (mm)
    D: nugget diameter in a case where a joint portion is a spot-welded portion (mm)
    W: effective width that a spot-welded portion receives a load (mm)
    el: total elongation of the object to be analyzed ($\varepsilon$)
    e: an element size of a base material portion (mm).

4. The break prediction method according to claim 3, wherein in Equation (4), the total plastic bending moment Mp is defined by Equation (5), and the correction terms F(Mp, t, D, W, el, e) are defined by Equation (6), $$Mp = (TS \cdot W \cdot t^2)/4 \quad (5)$$

where, TS: tensile strength of the object to be analyzed (MPa)

$$F(Mp, t, D, W, el, e) = f(Mp) \cdot f(t) \cdot f(D) \cdot f(W) \cdot f(el) \cdot f(e) \quad (6)$$

where, f(Mp): correction term of the total plastic bending moment Mp
f(t): correction term of the thickness t
f(D): correction term of the nugget diameter D
f(W): correction term of the effective width W
f(el): correction term of total elongation el
f(e): correction term of the element size e of the base material portion.

5. The break prediction method according to claim 4, wherein f(Mp), f(t), f(D), f(W), f(el), and f(e) are equations which are determined from multiple regression such that an error between a moment applied to a spot-welded portion, obtained by loading a breaking load which is confirmed by experiments to a test piece edge and the break limit moment Mf calculated using Equation (4) is minimized, in a finite element method model generated using an L-shaped joint type test piece.

6. The break prediction method according to claim 1, wherein in the third step, in a case where a relationship between the moment M1 applied to the joint portion in a deformation analysis of an element model of the object to be analyzed and the break limit moment Mf satisfies Equation (9), a result indicating that there is a break is output as the break prediction result, $$M1/Mf \gtrsim 1 \quad (9).$$

7. The break prediction method according to claim 1, wherein in the third step, in a case where an axial force applied to the joint portion in a deformation analysis of an element model of the object to be analyzed is a compressed axial force, a result indicating that there is no break is forcibly output as the break prediction result.

8. A break prediction device which predicts a break of a joint portion of an object to be analyzed including a pair of members joined to each other by using a finite element method, the break prediction device comprising:

a parameter acquisition processing circuitry to acquire at least an element size of a base material portion, from among parameters set in an element model for the object to be analyzed;

a storage that stores a break limit moment that is based on at least the element size of the base material portion;

a break discernment standard calculation processing circuitry to calculate the break limit moment as a break discernment standard by using the element size of the base material portion which is acquired by the parameter acquisition processing circuitry; and a break discernment processing circuitry to discern whether the moment applied to the joint portion in a deformation analysis of the element model for the object to be analyzed exceeds the break limit moment, output a result of the discernment as a break prediction result for the joint portion, and a structure of the joint portion of the object for preventing break at the time of collision based on the base material and the break prediction result for the joint portion, wherein the parameter acquisition processing circuitry acquires a tensile strength of the object to be analyzed and the element size of the base material portion, from among the parameters set in the element model, wherein the storage stores a plurality of functions corresponding to the tensile strength, and wherein the break discernment standard calculation processing circuitry reads the function corresponding to the tensile strength acquired by the parameter acquisition processing circuitry from the storage and calculates the break limit moment, wherein in a case where the tensile strength is equal to or greater than 980 MPa, the break discernment standard calculation processing circuitry reads Equation (1) from the storage and calculates the break limit moment, $$Mf=Me \cdot F(Me,t,D,W,L,e) \quad (1)$$

where, Mf: break limit moment (N·mm)
Me: modified elastic bending moment (N·mm)
F (Me, t, D, W, L, e): correction terms
  t: thickness of the object to be analyzed (mm)
  D: nugget diameter in a case where a joint portion is a spot-welded portion (mm)
  W: effective width that a spot-welded portion receives a load (mm)
  L: arm length (mm)
  e: an element size of a base material portion (mm), and wherein in Equation (1), the modified elastic bending moment Me is defined by Equation (2), the correction terms F(Me, t, D, W, L, e) are defined by Equation (3), $$Me=(el/L) \cdot (E \cdot D \cdot t^3)/12 \quad (2)$$

where, el: total elongation of an object to be analyzed (ε)
E: Young's modulus of the object to be analyzed (MPa)

$$F(Me,t,D,W,L,e)=f(Me) \cdot f(t) \cdot f(D) \cdot f(W) \cdot f(L) \cdot f(e) \quad (3)$$

where, f(Me): correction term of the modified elastic bending moment Me
f(t): correction term of the thickness t
f(D): correction term of the nugget diameter D
f(W): correction term of the effective width W
f(L): correction term of the arm length L
f(e): correction term of the element size e of the base material portion.

9. The break prediction device according to claim 8, wherein f(Me), f(t), f(D), f(W), f(L), and f(e) are equations which are determined from multiple regression such that an error between a moment applied to a spot-welded portion, obtained by loading a breaking load which is confirmed by experiments to a test piece edge and the break limit moment Mf calculated using Equation (1) is minimized, in a finite element method model generated using an L-shaped joint type test piece.

10. The break prediction device according to claim 8, wherein in a case where the tensile strength is less than 980 MPa, the break discernment standard calculation processing circuitry reads Equation (4) from the storage and calculates the break limit moment, $$Mf=Mp \cdot F(Mp,t,D,W,el,e) \quad (4)$$

where, Mf: break limit moment (N·mm)
Mp: total plastic bending moment (N·mm)
F(Mp, t, D, W, el, e): correction terms
  t: thickness of the object to be analyzed (mm)
  D: nugget diameter in a case where a joint portion is a spot-welded portion (mm)
  W: effective width that a spot-welded portion receives a load (mm)
  el: total elongation of the object to be analyzed (ε)
  e: an element size of a base material portion (mm).

11. The break prediction device according to claim 10, wherein in Equation (4), the total plastic bending moment Mp is defined by Equation (5), and the correction terms F(Mp, t, D, W, el, e) are defined by Equation (6), $$Mp=(TS \cdot W \cdot t^2)/4 \quad (5)$$

where, TS: tensile strength of the object to be analyzed (MPa)

$$F(Mp,t,D,W,el,e)=f(Mp) \cdot f(t) \cdot f(D) \cdot f(W) \cdot f(el) \cdot f(e) \quad (6)$$

where, f(Mp): correction term of the total plastic bending moment Mp
f(t): correction term of the thickness t
f(D): correction term of the nugget diameter D
f(W): correction term of the effective width W
f(el): correction term of total elongation el
f(e): correction term of the element size e of the base material portion.

12. The break prediction device according to claim 11, wherein f(Mp), f(t), f(D), f(W), f(el), and f(e) are equations which are determined from multiple regression such that an error between a moment applied to a spot-welded portion, obtained by loading a breaking load which is confirmed by experiments to a test piece edge and the break limit moment Mf calculated using Equation (4) is minimized, in a finite element method model generated using an L-shaped joint type test piece.

13. The break prediction device according to claim 8, wherein in a case where a relationship between the moment M1 applied to the joint portion in a deformation analysis of an element model of the object to be analyzed and the break limit moment Mf satisfies Equation (9), the break discernment processing circuitry outputs a result indicating that there is a break as the break prediction result, $$M1/Mf \geq 1 \quad (9).$$

14. The break prediction device according to claim 8, wherein in a case where an axial force applied to the joint portion in a deformation analysis of an element model of the object to be analyzed is a compressed axial force, the break discernment processing circuitry forcibly outputs a result indicating that there is no break as the break prediction result.

15. A non-transitory computer readable medium having a program causing a computer to execute a process of predicting a break of a joint portion of an object to be analyzed including a pair of members joined to each other by using a finite element method, the process comprising:
  a first process of acquiring at least an element size of a base material portion, from among parameters set in an element model for the object to be analyzed;
  a second process of calculating, as a break discernment standard, a break limit moment based on at least the element size of the base material portion;
  a third process of discerning whether the moment applied to the joint portion in a deformation analysis of the element model for the object to be analyzed exceeds the break limit moment, and outputting a result of the discernment as a break prediction result for the joint portion, and
  a process of designing a structure of the joint portion of the object for preventing break at the time of collision based on the base material and the break prediction result for the joint portion, wherein in the first process, the computer is caused to execute a process of acquiring a tensile strength of the object to be analyzed and the element size of the base material portion from among the parameters set in the element model, and wherein in the second process, the computer is caused to execute a process of changing the calculation of the break limit moment depending on the tensile strength, wherein in a case where the tensile strength is equal to or greater than 980 MPa, in the second process, the computer is caused to execute a process of calculating the break limit moment by using Equation (1), $$Mf = Me \cdot F(Me, t, D, W, L, e) \qquad (1)$$

where, Mf: break limit moment (N·mm)
Me: modified elastic bending moment (N·mm)
F (Me, t, D, W, L, e): correction terms
t: thickness of the object to be analyzed (mm)
D: nugget diameter in a case where a joint portion is a spot-welded portion (mm)
W: effective width that a spot-welded portion receives a load (mm)
L: arm length (mm)
e: an element size of a base material portion (mm), and wherein in Equation (1), the modified elastic bending moment Me is defined by Equation (2), the correction terms F(Me, t, D, W, L, e) are defined by Equation (3), $$Me = (el/L) \cdot (E \cdot D \cdot t^3)/12 \qquad (2)$$

where, el: total elongation of an object to be analyzed (ε)
E: Young's modulus of the object to be analyzed (MPa)

$$F(Me, t, D, W, L, e) = f(Me) \cdot f(t) \cdot f(D) \cdot f(W) \cdot f(L) \cdot f(e) \qquad (3)$$

where, f(Me): correction term of the modified elastic bending moment Me
f(t): correction term of the thickness t
f(D): correction term of the nugget diameter D
f(W): correction term of the effective width W
f(L): correction term of the arm length L
f(e): correction term of the element size e of the base material portion.

16. The non-transitory computer readable medium having the program according to claim 15,
wherein f(Me), f(t), f(D), f(W), f(L), and f(e) are equations which are determined from multiple regression such that an error between a moment applied to a spot-welded portion, obtained by loading a breaking load which is confirmed by experiments to a test piece edge and the break limit moment Mf calculated using Equation (1) is minimized, in a finite element method model generated using an L-shaped joint type test piece.

17. The non-transitory computer readable medium having the program according to claim 15,
wherein in a case where the tensile strength is less than 980 MPa,
in the second process, the computer is caused to execute a process of calculating the break limit moment by using Equation (4), $$Mf = Mp \cdot F(Mp, t, D, W, el, e) \qquad (4)$$

where, Mf: break limit moment (N·mm)
Mp: total plastic bending moment (N·mm)
F(Mp, t, D, W, el, e): correction terms
t: thickness of the object to be analyzed (mm)
D: nugget diameter in a case where a joint portion is a spot-welded portion (mm)
W: effective width that a spot-welded portion receives a load (mm)
el: total elongation of the object to be analyzed (ε)
e: an element size of a base material portion (mm).

18. The non-transitory computer readable medium having the program according to claim 17,
wherein in Equation (4), the total plastic bending moment Mp is defined by Equation (5), and the correction terms F(Mp, t, D, W, el, e) are defined by Equation (6), $$Mp = (TS \cdot W \cdot t^2)/4 \qquad (5)$$

where, TS: tensile strength of the object to be analyzed (MPa)

$$F(Mp, t, D, W, el, e) = f(Mp) \cdot f(t) \cdot f(D) \cdot f(W) \cdot f(el) \cdot f(e) \qquad (6)$$

where, f(Mp): correction term of the total plastic bending moment Mp
f(t): correction term of the thickness t
f(D): correction term of the nugget diameter D
f(W): correction term of the effective width W
f(el): correction term of total elongation el
f(e): correction term of the element size e of the base material portion.

19. The non-transitory computer readable medium having the program according to claim 18,
wherein f(Mp), f(t), f(D), f(W), f(el), and f(e) are equations which are determined from multiple regression such that an error between a moment applied to a spot-welded portion, obtained by loading a breaking load which is confirmed by experiments to a test piece edge and the break limit moment Mf calculated using Equation (4) is minimized, in a finite element method model generated using an L-shaped joint type test piece.

20. The non-transitory computer readable medium having the program according to claim 15,
wherein in the third process, in a case where a relationship between the moment M1 applied to the joint portion in a deformation analysis of an element model of the object to be analyzed and the break limit moment Mf satisfies Equation (9), the computer is caused to execute a process of outputting a result indicating that there is a break as the break prediction result, $$M1/Mf \geq 1 \qquad (9).$$

21. The non-transitory computer readable medium having the program according to claim 15,
wherein in the third process, in a case where an axial force applied to the joint portion in a deformation analysis of an element model of the object to be analyzed is a compressed axial force, the computer is caused to execute a process of forcibly outputting a result indicating that there is no break as the break prediction result.

22. A break discernment standard calculation method which calculates a break discernment standard used when predicting a break of a joint portion of an object to be analyzed including a pair of members joined to each other by using a finite element method, the method comprising:
a first step of acquiring at least an element size of a base material portion, from among parameters set in an element model for the object to be analyzed;
a second step of calculating, as a break discernment standard, a break limit moment based on at least the element size of the base material portion; and a step of designing a structure of the joint portion of the object for preventing break at the time of collision based on the base material and the break prediction result for the joint portion, wherein in the first step, from among the parameters set in the element model, a tensile strength of the object to be analyzed and the element size of the base material portion are acquired; and wherein in the second step, the calculation of the break limit moment is changed depending on the tensile strength, wherein in a case where the tensile strength is equal to or greater than 980 MPa, in the second step, the break limit moment is calculated by using Equation (1), $$Mf = Me \cdot F(Me, t, D, W, L, e) \qquad (1)$$

where, Mf: break limit moment (N·mm)
Me: modified elastic bending moment (N·mm)
F (Me, t, D, W, L, e): correction terms
  t: thickness of the object to be analyzed (mm)
  D: nugget diameter in a case where a joint portion is a spot-welded portion (mm)
  W: effective width that a spot-welded portion receives a load (mm)
  L: arm length (mm)
  e: an element size of a base material portion (mm) and, wherein in Equation (1), the modified elastic bending moment Me is defined by Equation (2), the correction terms F(Me, t, D, W, L, e) are defined by Equation (3), $$Me = (el/L) \cdot (E \cdot D \cdot t^3)/12 \qquad (2)$$

where, el: total elongation of an object to be analyzed ($\varepsilon$)
E: Young's modulus of the object to be analyzed (MPa)

$$F(Me, t, D, W, L, e) = f(Me) \cdot f(t) \cdot f(D) \cdot f(W) \cdot f(L) \cdot f(e) \qquad (3)$$

where, f(Me): correction term of the modified elastic bending moment Me
f(t): correction term of the thickness t
f(D): correction term of the nugget diameter D
f(W): correction term of the effective width W
f(L): correction term of the arm length L
f(e): correction term of the element size e of the base material portion.

23. The break prediction method according to claim 22, wherein f(Me), f(t), f(D), f(W), f(L), and f(e) are equations which are determined from multiple regression such that an error between a moment applied to a spot-welded portion, obtained by loading a breaking load which is confirmed by experiments to a test piece edge and the break limit moment Mf calculated using Equation (1) is minimized, in a finite element method model generated using an L-shaped joint type test piece.

24. The break prediction method according to claim 22, wherein in a case where the tensile strength is less than 980 MPa, in the second step, the break limit moment is calculated using Equation (4), $$Mf = Mp \cdot F(Mp, t, D, W, el, e) \qquad (4)$$

where, Mf: break limit moment (N·mm)
Mp: total plastic bending moment (N·mm)
F(Mp, t, D, W, el, e): correction terms
  t: thickness of the object to be analyzed (mm)
  D: nugget diameter in a case where a joint portion is a spot-welded portion (mm)
  W: effective width that a spot-welded portion receives a load (mm)
  el: total elongation of the object to be analyzed ($\varepsilon$)
  e: an element size of a base material portion (mm).

25. The break prediction method according to claim 24, wherein in Equation (4), the total plastic bending moment Mp is defined by Equation (5), and the correction terms F(Mp, t, D, W, el, e) are defined by Equation (6), $$Mp = (TS \cdot W \cdot t^2)/4 \qquad (5)$$

where, TS: tensile strength of the object to be analyzed (MPa)

$$F(Mp, t, D, W, el, e) = f(Mp) \cdot f(t) \cdot f(D) \cdot f(W) \cdot f(el) \cdot f(e) \qquad (6)$$

where, f(Mp): correction term of the total plastic bending moment Mp
f(t): correction term of the thickness t
f(D): correction term of the nugget diameter D
f(W): correction term of the effective width W
f(el): correction term of total elongation el
f(e): correction term of the element size e of the base material portion.

26. The break prediction method according to claim 25, wherein f(Mp), f(t), f(D), f(W), f(el), and f(e) are equations which are determined from multiple regression such that an error between a moment applied to a spot-welded portion, obtained by loading a breaking load which is confirmed by experiments to a test piece edge and the break limit moment Mf calculated using Equation (4) is minimized, in a finite element method model generated using an L-shaped joint type test piece.

27. The break prediction method according to claim 22, wherein in the third step, in a case where a relationship between the moment M1 applied to the joint portion in a deformation analysis of an element model of the object to be analyzed and the break limit moment Mf satisfies Equation (9), a result indicating that there is a break is output as the break prediction result, $$M1/Mf \geq 1 \qquad (9).$$

28. The break prediction method according to claim 22, wherein in the third step, in a case where an axial force applied to the joint portion in a deformation analysis of an element model of the object to be analyzed is a compressed axial force, a result indicating that there is no break is forcibly output as the break prediction result.

* * * * *